United States Patent
Ling et al.

(10) Patent No.: US 9,354,297 B2
(45) Date of Patent: May 31, 2016

(54) POSITION LOCATION USING PHASE-ADJUSTED TRANSMITTERS

(75) Inventors: Fuyun Ling, San Diego, CA (US);
Gordon Kent Walker, Poway, CA (US);
Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/326,868

(22) Filed: Jan. 5, 2006

(65) Prior Publication Data

US 2007/0069952 A1    Mar. 29, 2007

Related U.S. Application Data

(60) Provisional application No. 60/721,505, filed on Sep. 27, 2005.

(51) Int. Cl.
| | |
|---|---|
| *G01S 5/14* | (2006.01) |
| *G01S 5/02* | (2010.01) |
| *H04W 64/00* | (2009.01) |
| *G01S 1/02* | (2010.01) |

(52) U.S. Cl.
CPC . *G01S 5/14* (2013.01); *G01S 1/024* (2013.01); *G01S 5/021* (2013.01); *G01S 5/0226* (2013.01); *H04W 64/00* (2013.01)

(58) Field of Classification Search
USPC ............... 342/387, 463–464, 356, 458, 354
IPC ............................................. G01S 5/021,1/024
See application file for complete search history.

(56) References Cited

U.S. PATENT DOCUMENTS 5,017,926 A * 5/1991 Ames et al. .............. 342/353
5,225,842 A    7/1993 Brown et al.
(Continued)

FOREIGN PATENT DOCUMENTS

CA    2330280    11/1999
CN    1306708 A    8/2001
(Continued)

OTHER PUBLICATIONS

Offline or off-line. (2011). In The American Heritage dictionary of the English language. Retrieved from http://search.credoreference.com/content/entry/hmdictenglang/offline_or_off_line/0.*
(Continued)

*Primary Examiner* — Tashiana Adams
*Assistant Examiner* — Fred H Mull
(74) *Attorney, Agent, or Firm* — Norton Rose Fulbright US LLP

(57) ABSTRACT

Systems and methods are provided for determining position location information in a wireless network. In one embodiment, timing offset information is communicated between multiple transmitters and one or more receivers. Such information enables accurate position or location determinations to be made that account for timing differences throughout the network. In another embodiment, transmitter phase adjustments are made that advance or delay transmissions from the transmitters to account for potential timing differences at receivers. In yet another embodiment, combinations of timing offset communications and/or transmitter phase adjustments can be employed in the wireless network to facilitate position location determinations.

57 Claims, 10 Drawing Sheets

(56) References Cited

U.S. PATENT DOCUMENTS

| | | | |
|---|---|---|---|
| 5,638,379 A | | 6/1997 | Narasimha et al. |
| 5,689,270 A | | 11/1997 | Kelly et al. |
| 5,815,538 A | * | 9/1998 | Grell et al. ............. 375/356 |
| 5,982,324 A | * | 11/1999 | Watters et al. ............. 342/357.29 |
| 6,054,950 A | * | 4/2000 | Fontana ............. 342/463 |
| 6,157,690 A | | 12/2000 | Yoneda |
| 6,266,367 B1 | * | 7/2001 | Strait ............. 375/229 |
| 6,377,632 B1 | * | 4/2002 | Paulraj et al. ............. 375/299 |
| 6,522,890 B2 | * | 2/2003 | Drane et al. ............. 455/456.5 |
| 6,590,524 B1 | | 7/2003 | Farley et al. |
| 6,731,622 B1 | | 5/2004 | Frank et al. |
| 6,771,660 B1 | | 8/2004 | Bourlas et al. |
| 6,785,553 B2 | * | 8/2004 | Chang et al. ............. 455/456.5 |
| 6,850,734 B1 | | 2/2005 | Bruno et al. |
| 6,856,282 B2 | | 2/2005 | Mauro et al. |
| 6,861,984 B2 | * | 3/2005 | Rabinowitz et al. ............. 342/464 |
| 6,882,315 B2 | | 4/2005 | Richley et al. |
| 6,889,051 B2 | * | 5/2005 | Ogino et al. ............. 455/456.1 |
| 6,952,182 B2 | * | 10/2005 | Spilker et al. ............. 342/464 |
| 7,183,942 B2 | | 2/2007 | Rock et al. |
| 7,307,665 B2 | | 12/2007 | Opshaug et al. |
| 7,307,666 B2 | | 12/2007 | Wu et al. |
| 7,317,749 B2 | | 1/2008 | Song |
| 7,339,999 B2 | | 3/2008 | Gore |
| 7,564,775 B2 | * | 7/2009 | Jayaraman et al. ............. 370/208 |
| 7,756,002 B2 | * | 7/2010 | Batra et al. ............. 370/208 |
| 2002/0004398 A1 | | 1/2002 | Ogino et al. |
| 2002/0009974 A1 | * | 1/2002 | Kuwahara et al. ............. 455/67.6 |
| 2003/0156063 A1 | * | 8/2003 | Spilker et al. ............. 342/464 |
| 2003/0162547 A1 | | 8/2003 | McNair |
| 2004/0001429 A1 | * | 1/2004 | Ma et al. ............. 370/210 |
| 2004/0081131 A1 | | 4/2004 | Walton et al. |
| 2004/0140932 A1 | * | 7/2004 | Spilker, Jr. ............. 342/464 |
| 2004/0202260 A1 | | 10/2004 | Tung et al. |
| 2004/0203392 A1 | | 10/2004 | Hsu et al. |
| 2005/0141475 A1 | | 6/2005 | Vijayan et al. |
| 2005/0148346 A1 | | 7/2005 | Maloney et al. |
| 2005/0227706 A1 | * | 10/2005 | Syrjarinne ............. 455/456.1 |
| 2005/0281292 A1 | * | 12/2005 | Troulis et al. ............. 370/516 |
| 2005/0282568 A1 | | 12/2005 | Keerthi |
| 2006/0002453 A1 | | 1/2006 | Song |
| 2006/0019602 A1 | | 1/2006 | Ionescu et al. |
| 2006/0022873 A1 | * | 2/2006 | Zimmerman ............. 342/464 |
| 2006/0056563 A1 | * | 3/2006 | Aweya et al. ............. 375/376 |
| 2006/0217084 A1 | | 9/2006 | Gupta et al. |
| 2007/0008220 A1 | * | 1/2007 | Rabinowitz et al. ............. 342/458 |
| 2007/0069953 A1 | * | 3/2007 | Ling et al. ............. 342/463 |
| 2007/0072621 A1 | | 3/2007 | Mukkavilli et al. |
| 2007/0100548 A1 | * | 5/2007 | Small ............. 701/214 |
| 2007/0195832 A1 | * | 8/2007 | Liu ............. 370/539 |

FOREIGN PATENT DOCUMENTS

| | | |
|---|---|---|
| JP | 2000244385 A | 9/2000 |
| JP | 2002027533 A | 1/2002 |
| JP | 2002031675 A | 1/2002 |
| JP | 2003110491 A | 4/2003 |
| JP | 2004072660 A | 3/2004 |
| JP | 2004509358 A | 3/2004 |
| JP | 2004109139 A | 4/2004 |
| JP | 2004208274 A | 7/2004 |
| JP | 2004279409 A | 10/2004 |
| JP | 2005512103 A | 4/2005 |
| JP | 2005221331 A | 8/2005 |
| JP | 2007519920 A | 7/2007 |
| JP | 2009510447 A | 3/2009 |
| KR | 20050042242 | 5/2005 |
| TW | 200723764 | 6/2007 |
| TW | 200723765 | 6/2007 |
| TW | 200733759 | 9/2007 |
| WO | 9723785 A1 | 7/1997 |
| WO | 9852376 | 11/1998 |
| WO | 9956413 | 11/1999 |
| WO | WO 02/25829 | 3/2002 |
| WO | WO 03/051029 | 6/2003 |
| WO | 03063462 | 7/2003 |
| WO | 2004039027 | 5/2004 |
| WO | WO-2004088880 A2 | 10/2004 |
| WO | 2005012935 A1 | 2/2005 |
| WO | WO2005043829 | 5/2005 |
| WO | WO2005047922 A1 | 5/2005 |
| WO | 2005073751 A1 | 8/2005 |
| WO | WO-2005071430 A1 | 8/2005 |
| WO | WO2005074217 | 8/2005 |

OTHER PUBLICATIONS

International Search Report—PCT/US06/037946, International Search Authority—European Patent Office—Feb. 12, 2007.

International Preliminary Report on Patentability PCT/US06/037946, IB Geneva Switzerland, Apr. 1, 2008.

Written Opinion PCT/US06/037946 IB European Patent Office Mar. 28, 2008.

Taiwanese Search Report—095135854—TIPO—Dec. 5, 2009.

Hyoung-Kyu Song, et all., "Frequency-Offset Synchronization and Channel Estimation for OFDM-Based Transmission", 2000, IEEE.

In light of, In the American Heritage Dictionary of Idioms, 1997. Retrieved from internet <http://www.credoreference.com/entry/hmidiom/in_light_of>.

Rabinowitz M., et al., A New Positioning System using Television Synchronization Signals, IEEE Transactions on Broadcasting, vol. 51 No. 1, 2005, pp. 51-61.

* cited by examiner

POSITION LOCATION USING PHASE-ADJUSTED TRANSMITTERS

CLAIM OF PRIORITY UNDER 35 U.S.C. §119

The present Application for Patent claims priority to Provisional Application No. 60/721,505 entitled "POSITION LOCATION USING TRANSMITTERS WITH TIMING OFFSET" filed Sep. 27, 2005, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

U.S. patent application Ser. No. 11/327,536 filed Jan. 5, 2006, assigned to the assignee hereof, and expressly incorporated by reference herein; and U.S. patent application Ser. No. 11/327,536 filed Jan. 5, 2006, assigned to the assignee hereof, and expressly incorporated by reference herein.

I. FIELD

The subject technology relates generally to communications systems and methods, and more particularly to systems and methods that determine position locations in accordance with wireless networks by employing timing offsets or transmitter phase adjustment techniques within the networks.

II. BACKGROUND

One technology that has dominated wireless systems is Code Division Multiple Access (CDMA) digital wireless technology. In addition to CDMA, an air interface specification defines FLO (Forward Link Only) technology that has been developed by an industry-led group of wireless providers. In general, FLO has leveraged the most advantageous features of wireless technologies available and used the latest advances in coding and system design to consistently achieve the highest-quality performance. One goal is for FLO to be a globally adopted standard.

The FLO technology was designed in one case for a mobile multimedia environment and exhibits performance characteristics suited ideally for use on cellular handsets. It uses the latest advances in coding and interleaving to achieve the highest-quality reception at all times, both for real-time content streaming and other data services. FLO technology can provide robust mobile performance and high capacity without compromising power consumption. The technology also reduces the network cost of delivering multimedia content by dramatically decreasing the number of transmitters needed to be deployed. In addition, FLO technology-based multimedia multicasting complements wireless operators' cellular network data and voice services, delivering content to the same cellular handsets used on 3G networks.

The FLO wireless system has been designed to broadcast real time audio and video signals, apart from non-real time services to mobile users. The respective FLO transmission is carried out using tall and high power transmitters to ensure wide coverage in a given geographical area. Further, it is common to deploy 3-4 transmitters in most markets to ensure that the FLO signal reaches a significant portion of the population in a given market. Because of FLO transmitter coverage, it is possible to determine position locations based on triangulation techniques, for example. Traditional position location techniques make use of satellite based GPS signals for range measurements. However, the problem with satellite based signals is the lack of availability of the signal in indoor environments, for example, where line of sight to the satellites is not available. Conversely, FLO networks are often designed to achieve indoor coverage, and so the respective waveforms can provide positioning information to devices while located indoors.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Systems and methods are provided for determining position or location information across wireless networks and in lieu of (or in connection with) conventional Global Positioning System (GPS) techniques. In one embodiment, position location in a broadcast network is determined using multiple transmitters that account for timing differences between transmitters. Many position location algorithms assume that transmitters emanating signals used for range measurements are aligned in time using a common central clock such as GPS, for example. However, it is of some advantage in certain broadcast systems to advance/delay transmissions from some of the transmitters with respect to the central clock to facilitate signal reception and quality throughout the network. In such cases, position location algorithms make use of timing offset information of the transmitters to result in more accurate range measurements over conventional position location components. Thus, in some embodiments, overhead parameter information (e.g., timing offset information) can be transmitted as well as the use of this additional information at the receiver to result in accurate range measurements.

In another embodiment, signal transmission timing can be advanced or delayed at the respective transmitters to alleviate the need to account for timing offsets at the receiver. By adjusting the timing of transmitted signals at the transmitters, accurate position information can be determined at the respective receivers while mitigating timing offset calculations since timing mismatches from a centralized clock have already been accounted for at the transmitters. As can be appreciated, some systems can include combinations of timing offsets that are communicated to the receivers and/or timing adjustments at the transmitters to facilitate accurate position location determinations.

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

Figure 1:
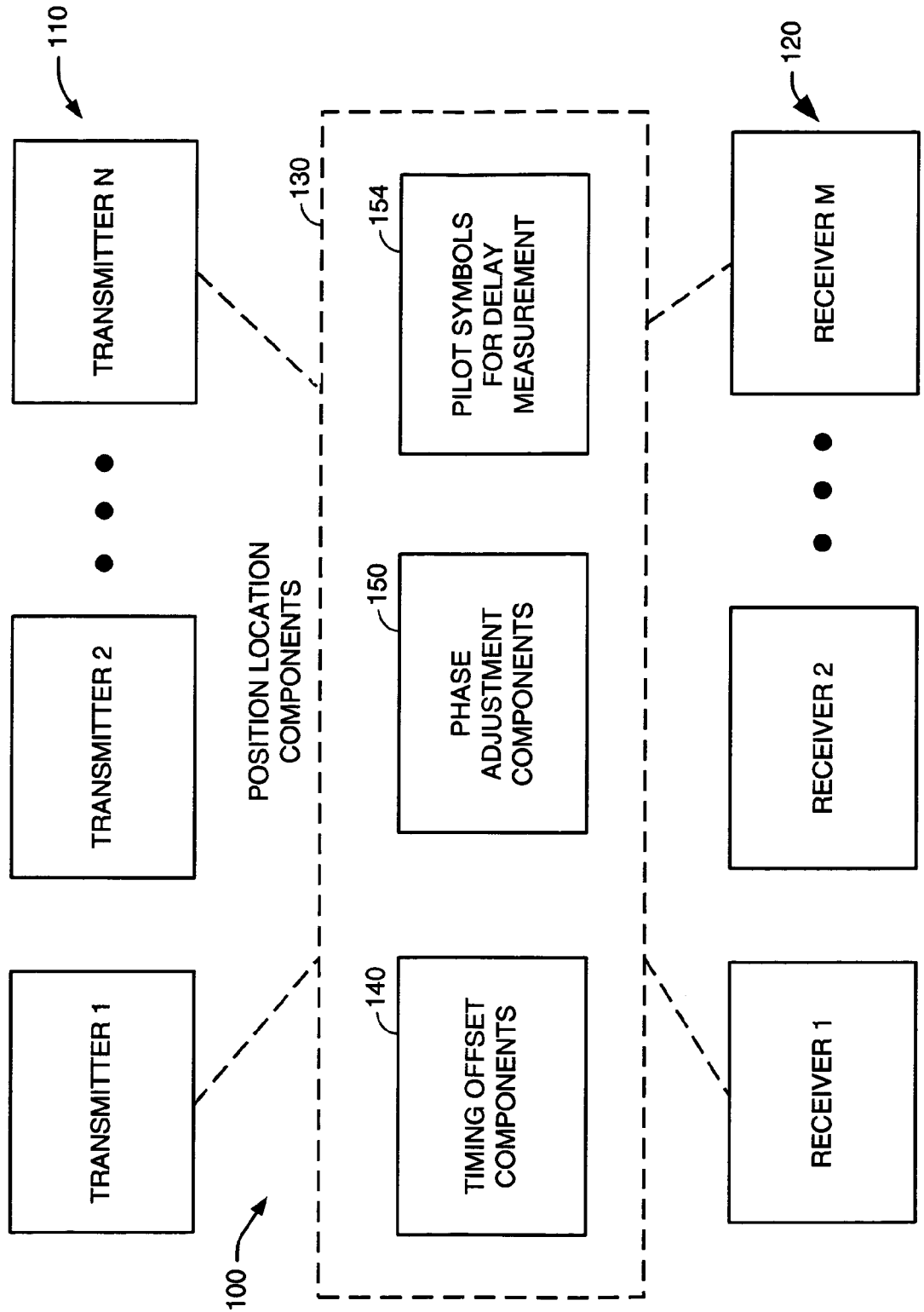
FIG. 1 is a schematic block diagram illustrating a wireless network positioning system.

Systems and methods are provided for determining position location information in a wireless network. In one embodiment, timing offset information is communicated between multiple transmitters and one or more receivers. Such information enables accurate position or location determinations to be made that account for timing differences throughout the network. In another embodiment, transmitter phase adjustments are made that advance or delay transmissions from the transmitters to account for potential timing difference between the transmitters and the common clock. In this manner, position location determinations can be made without further timing adjustment at the receivers. In yet another aspect, combinations of timing offset communications and/or transmitter phase adjustments can be employed in the wireless network to facilitate position location computations or determinations.

It is noted that timing offset can be considered a mismatch in timing between a transmitter clock and a common clock source which leads to synchronization symbols at the transmitter being transmitted at an offset compared to the common clock synchronization signals. For example, in the case of Forward Link Only (FLO) signals, the superframe boundary at the transmitter is generally expected to be synchronized to a 1 PPS signal from a GPS. However, due to timing mismatch or sometimes intentionally for network optimization purposes, the superframe boundary may actually be earlier or delayed with respect to the 1 PPS signal from the GPS. This is referred to as timing offset at the transmitter.

With phase adjustments at the transmitter, the transmitter waveform is essentially modified to regulate the propagation delay perceived by the receiver, irrespective of timing offsets at the transmitter. In this case, even though the transmitter's clock (and hence transmission) may be precisely synchronized with the common clock source, it is possible that the transmitter waveform is modified to result in skewed propagation delay measurements at the receiver. For example, in the case of FLO employing OFDM signaling, the superframe boundary could be synchronized with the 1 PPS signal from GPS. However, the transmitter could adjust the transmission phase by employing a cyclic shift of the OFDM symbol buffer. The cyclic prefix for the OFDM symbol can be formed based on the cyclically shifted OFDM symbol. With such a signal modification, the delay perceived by the receiver changes with the transmission phase chosen (or equivalently the amount of cyclic shift on the OFDM symbol). This is referred to as phase adjustment at the transmitter.

As used in this application, the terms "component," "network," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

FIG. 1 illustrates a wireless network positioning system 100. The system 100 includes one or more transmitters 110 that communicate across a wireless network to one or more receivers 120. The receivers 120 can include substantially any type of communicating device such as a cell phone, computer, personal assistant, hand held or laptop devices, and so forth. The system 100 employs one or more position location components 130 to facilitate determining a position or location for the receivers 120. In general, timing synchronization information between the transmitters 110 and the receivers 120 may need to be adjusted in various embodiments described herein to facilitate accurate position location determinations at the receivers. In one case, timing offset components 140 can be communicated between transmitter 110 and receiver 120 to indicate timing differences or adjustments in the wireless network to be accounted for in a position location determination component or algorithm. Another case employs phase adjustment components 150 at the transmitters 110 to advance or delay signals that have the effect of compensating for timing mismatches or differences that may occur in the system 100. In other embodiments, various combinations of timing offset components 140 and/or phase adjustment components 150 can be employed concurrently to facilitate position location determinations in the wireless network positioning system 100. As illustrated, one or more pilot symbols 154 can be provided for delay measurement.

Generally, conventional position location techniques make use of satellite based GPS signals for range measurements. However, one problem with satellite based signals is the lack of availability of the signal such as with indoor environments where line of sight to the satellites is not available. On the other hand, the high power nature of Forward Link Only (FLO) transmission facilitates that the FLO waveform is available in indoor environments where the GPS signal is not available. Hence, there is an alternative to position location based on measurements made from FLO signals when the FLO signal from multiple transmitters is available. In the following description, it may be assumed that a FLO receiver is able to access signals from at least three different FLO transmitters (other configurations possible), which may or may not be transmitting the same information content.

The FLO network is generally deployed for Single Frequency Network (SFN) mode of operation where the transmitters are synchronized to a common clock source. The clock source, for example, could be derived from a 1 PPS signal from the GPS, for example. The FLO waveform is based on Orthogonal Frequency Division Multiplexing (OFDM) signaling and can be designed under the assumption that delay spread of a channel would be less than about 135 us, for example. When multiple transmitters 110 are visible to a receiver 120, the delay spread perceived by the receiver is a function of the relative position of the receiver from various transmitters. In some cases, it is possible that the receiver 120 is close to one of the transmitters 110 and far from one other transmitter thus resulting in a large delay spread. If the resulting delay spread exceeds the design specification of 135 us (or other reference), it can incur significant penalty on system performance. However, it is possible to control the delay spread perceived by the receiver 120 at various points in the network by delaying or advancing a super-frame boundary with respect to a synchronization pulse from the central clock. Hence, in an optimized FLO network deployment, it can also be realistic to assume that there is a fixed timing offset between different transmitters 110.

In a SFN deployment of a FLO network, the transmitters 110 are likely to be tuned to operate a fixed timing offset with respect to a central clock (and hence each other) to optimize the delay spread seen at the receiver 120 and hence the system performance. The relative timing offsets at the transmitter can adversely affect range measurements for position location if not accounted for. However, in mobile-based position location and network-based position location, it is possible to account for transmitter timing offset by modifying the range calculations. This can include having the FLO network provide the transmitter timing offset information to the receiver 120 in a mobile-based position location system, adjusting transmitting timing and phase signals, or a combination of timing offsets with signal adjustments.

Figure 2:
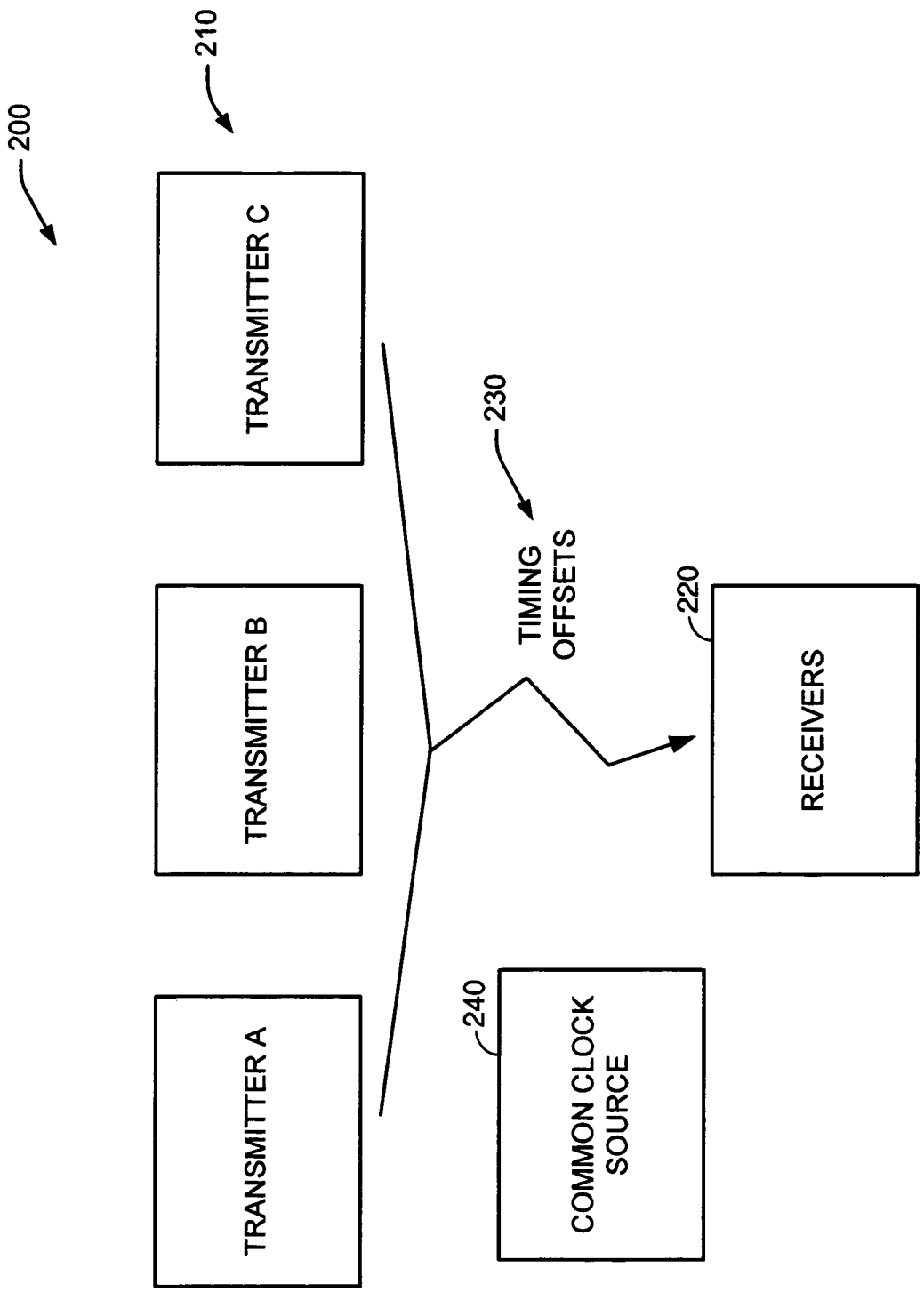
FIG. 2 is an example system that employs timing offset information for position location determinations.

FIG. 2 illustrates an example system 200 that employs timing offsets for position determinations. In this example, transmitters A, B and C at 210 can be three different FLO transmitters carrying FLO signals that are within the range of reception of a receiver 220 at a given point in time. Further, let $d_a$, $d_b$ and $d_c$ refer to a timing offset 230 of the respective transmitters with respect to a common clock source 240. Here, positive offset refers to advancing the transmission with respect to the central clock 240 while a negative offset would refer to delaying transmission with respect to the central clock. It can be assumed that a receiver clock is synchronized to the common clock source 240 in phase and frequency.

The FLO air interface specification which is commonly available allows for each transmitter 210 to insert symbols (known as positioning pilot channel) unique to the transmitter. These symbols can be designed to allow the receiver 220 to estimate the propagation delay from each of the transmitters 210. The positioning pilot channel is essentially a set of pilot tones specific to each transmitter, designed with high processing gain so that a channel with long delay spread as well as weak energy can still be detected at the receiver 220. In the case of line of sight propagation without significant scattering from the transmitter 210 to the receiver 220, the channel estimate obtained via the positioning pilot generally comprises of a single path. The distance of the receiver 220 from the transmitter 210 is determined based on the location of the channel path in the channel estimate.

In the system example 200, let $\tau_a$ be the location of the single path (or the first arriving path in the case of multi-path) in the channel estimate based on positioning pilot channel from transmitter A. Similarly, let $\tau_b$ and $\tau_c$ be the delay of the first arriving path in the channel estimate from the transmitters B and C respectively. If the clocks at the three transmitters 210, as well as the receiver 220, were synchronized in frequency as well as phase, then the distance of the receiver from the transmitters is calculated as the velocity of light (c) multiplied by the propagation delay measured via the channel estimate. However, in the presence of timing offsets at the transmitters 210, the measured delays at the receiver 220 should be corrected by timing offset 230 between the transmitter and the receiver. Hence, the distance of the receiver from the transmitter A is given by:

$S_a=(d_a+\tau_a)\times c$, where c is the velocity of light.

Similarly, $S_b=(d_b+\tau_b)\times c$, and $S_c=(d_c+\tau_c)\times c$. When the relative distance of the receiver 220 from three known locations is determined (in this case, the known locations are the FLO transmitters), the location of the receiver can be obtained by the well known method of triangulation. The method of triangulation is essentially determining the single point of intersection for circles drawn around the three transmitters A, B and C with radii $S_a$, $S_b$ and $S_c$ respectively. Hence it is clear that in the case of relative timing offsets at the transmitters 210, it is useful for the receiver 220 to be aware of the timing offset values 230 to determine position or location accurately.

Figure 3:
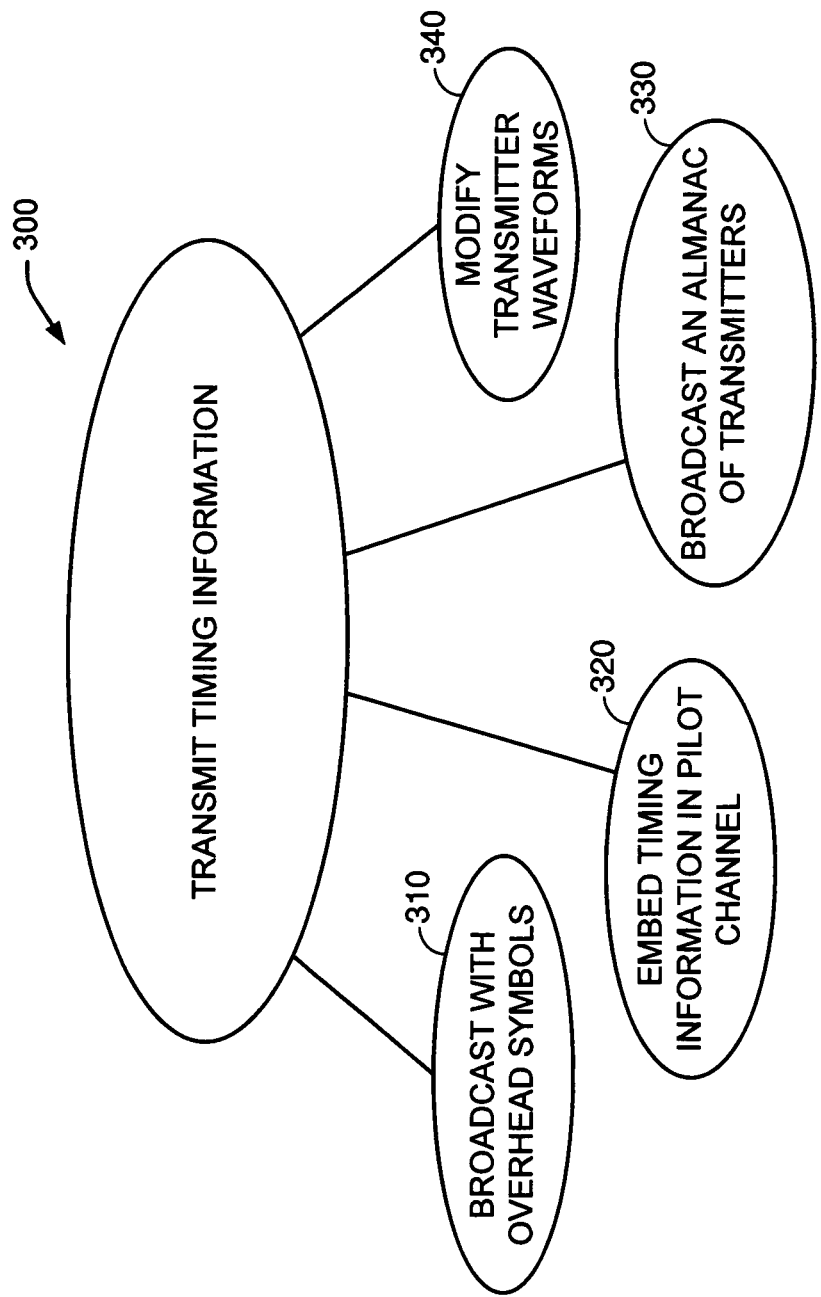
FIG. 3 illustrates example techniques for transmitting timing offset information.

FIG. 3 illustrates example methods for communicating timing information 300. As can be appreciated, there are several possible techniques for transmitting timing offset information 300 to a receiver. It is noted that it is sufficient for the receiver to be aware of the timing offset of each of the transmitters with respect to a common central clock such as the GPS clock or other common clock.

At 310, one possible transmission mechanism is for the transmitters to broadcast the information about the timing offset using overhead symbols. For instance, in the FLO system, the timing information from all the transmitters in a given local area can be contained in the local area OIS field (Overhead Information Symbols) which is specific to a given local area but changes across different local areas in a given wide area. One advantage of such an approach is that the transmitter timing information is localized. It is noted that it may not offer an advantage to a receiver to receive timing offset information about a transmitter from which it cannot receive the positioning pilot channel. On the other side, the local OIS field may be more susceptible to interference at the edge of coverage than the positioning pilot channel. As a result, the receiver may be able to decode the positioning pilot channel successfully while unable to get the timing information from the local OIS channel. One variant of this approach would be to include the timing information in the wide area OIS which would remove the edge of coverage issues at the cost of broadcasting the transmitter timing information over a much wider geographical area (and hence useful bandwidth).

At 320, another possible technique to transmit timing information is to embed the transmitter timing information in the positioning pilot channel (PPC). In this case, the receiver can first estimate the channel from a given transmitter using the PPC from the transmitter and then decode the timing information embedded in the PPC. The processing gain of the PPC may have to be increased sufficiently in this case to facilitate that the detection probability of the PPC is not affected in the presence of additional information embedded in the symbols.

At 330, a third possible technique to transmit timing information is to broadcast an almanac of the transmitters as a non-real time MLC (MediaFLO Logical Channel) periodically and facilitate that the receivers decode this particular information MLC. At 340, another attractive technique mitigates the timing offset information at the transmitter by modifying the transmitter waveform for the PPC symbols by taking the timing offsets into consideration as discussed below with respect to FIG. 4.

Figure 4:
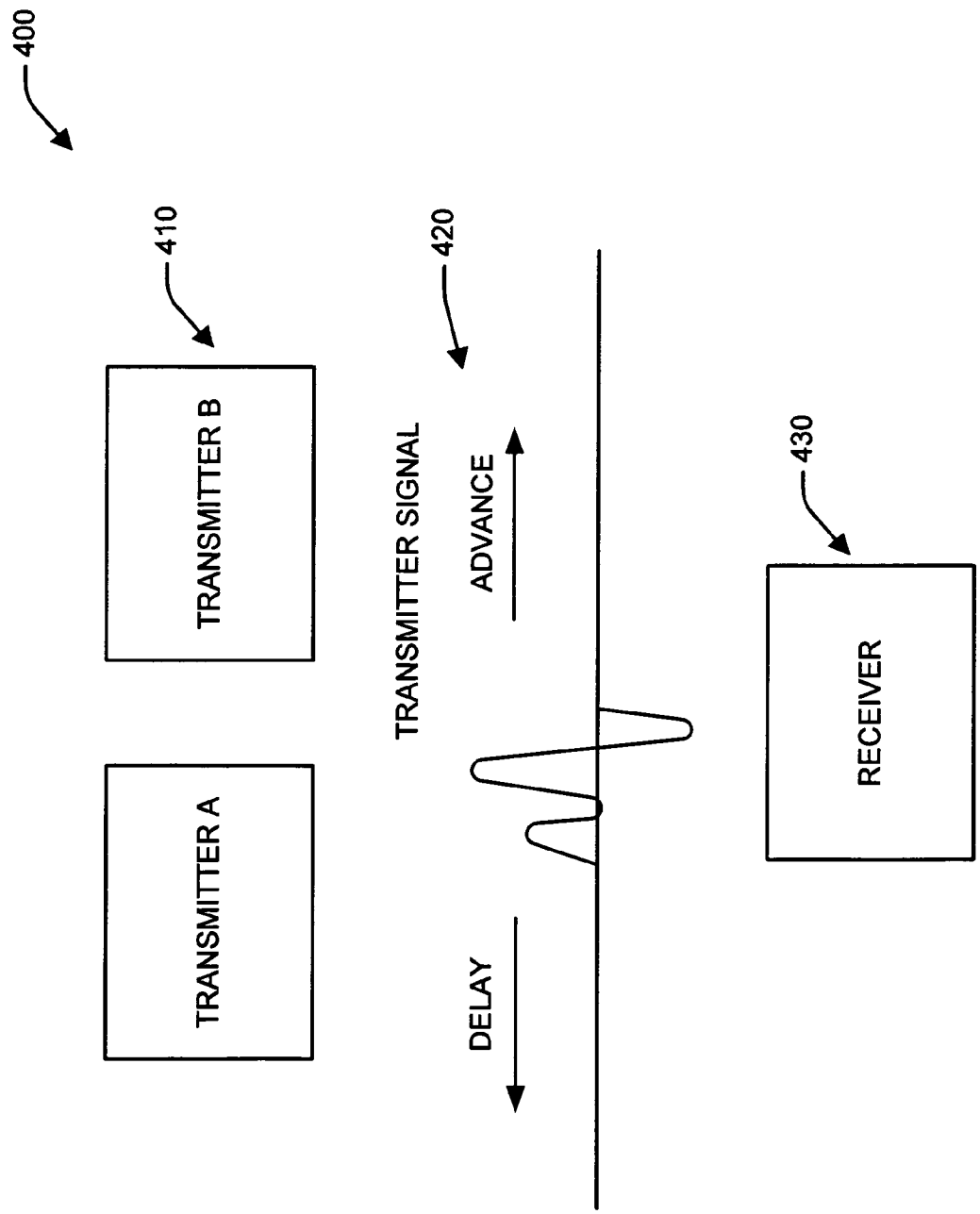
FIG. 4 illustrates an example system for adjusting timing information in a wireless positioning system.

FIG. 4 illustrates an example system 400 for adjusting timing information in a wireless positioning system. In this example, two transmitters A and B are shown at 410. A future transmission time of a signal from the transmitters 410 can be advanced or delayed at 420 to account for possible timing differences in the system. Thus, a receiver 430 may be able to determine position locations without having to determine offsets from a centralized clock as described above. The concept of advancing or delaying the transmitter timing at 420 is introduced in the FLO system so as to regulate the effective channel delay spread as perceived by the receiver 430. In one case, in an OFDM system, the linear convolution of the channel with the transmitted signal can be treated as a cyclic convolution if the delay spread of the channel is less than the cyclic prefix employed by the OFDM signal.

In this example, consider transmitters A and B at 410 with timing offsets $d_a$ and $d_b$. Let $\tau'_a$ be actual delay that would be perceived by a line of sight propagation component based on the distance between the transmitter A and the receiver 430. Similarly, let $\tau'_b$ be the actual delay that would be perceived by a line of sight component from the transmitter B to the receiver 430. Note that additional delays $d_a$ and $d_b$ are introduced at the transmitters when the delay spread $\tau'_b - \tau'_a$ exceeds the cyclic prefix (assuming one line of sight component from each of the transmitters). With delays $d_a$ and $d_b$ at the transmitters, the signal received at the receiver is given by:

$$y(n) = h_a(n) * x_a(n-d_a) + h_b(n) * x_b(n-d_b) + w(n), \quad \text{Equation 1}$$

Where $h_a(n)$ and $x_a(n)$ are the channel and the signal with respect to the transmitter A, * represents the linear convolution operation and $w(n)$ is the noise added at the receiver. In the case of traffic channel in a wide area network, $x_a(n)$ and $x_b(n)$ are generally the same (say $x(n)$).

Using the properties of linear convolution the above equation can be written as, $$y(n) = h_a(n-d_a) * x(n) + h_b(n-d_b) * x(n) + w(n) \quad \text{Equation 2}$$

So that the perceived channel delay spread is now given by $(\tau'_b - d_b) - (\tau'_a - d_a)$ and can be controlled by introducing timing offsets at the transmitter. When the effective delay spread is less than the cyclic prefix, the received signal in Equation 1 can be written as the cyclic convolution instead of a linear convolution. Thus:

$$y(n) = h_a(n) \otimes x_a(n-d_a) + h_b(n) \otimes x_b(n-d_b) + w(n), \quad \text{Equation 3}$$

or equivalently, $$y(n) = h_a(n-d_a) \otimes x_a(n) + h_b(n-d_b) \otimes x_b(n) + w(n) \quad \text{Equation 4}$$

where $\otimes$ denotes circular convolution. If the cyclic prefix is long enough, then the operation of delaying the signal $x_a(n)$ by $d_a$ in Equation 1 to result in Equation 3 can be accomplished by circular rotation of $x_a(n)$ by $d_a$ in Equation 3.

Based on the above cases, the following is proposed for the pilot positioning channel with respect to regular traffic channels. During the regular traffic channel, the cyclic prefix employed is typically short (512 chips in the case of FLO) and hence, the cyclic shift technique discussed in Equation 3 cannot be employed to regulate the effective delay spread of the channel. Therefore, the transmissions from the respective transmitters will be physically delayed (transmitters A and B by $d_a$ and $d_b$ in this example) to meet the cyclic prefix requirements. On the other hand, for the positioning pilot channel, a long cyclic prefix (of the order of 2500 chips in FLO, where chips refer to bits encoded into data packets) may be employed so as to enable the estimation of delay from weak transmitters that are far away. Further, the delays $d_a$ and $d_b$ introduced by the transmitters for the traffic channel affect the delay observations made in the positioning pilot channel, thus requiring this overhead information at the receiver as discussed previously.

Given the availability of a long cyclic prefix for the pilot positioning channel, the transmitter can undo the effect of the actual physical delays $d_a$ and $d_b$ by a cyclic shift of the positioning signal. If $x_{a,p}(n)$ is the intended positioning signal from the transmitter A with timing delay $d_a$, then the transmitter can send out a cyclically shifted version given by $x_{a,p}(n+d_a)$. Similarly, cyclically shift the signal from the transmitter B. Due to the presence of long cyclic prefix, Equation 3 is still valid and hence:

$$y(n) = h_a(n) \otimes x_{a,p}(n) + h_b(n) \otimes x_{b,p}(n) + w(n), \quad \text{Equation 5}$$

thus alleviating the need to send out the transmitter delay information to the receiver. This technique can be used to account for the transmitter timing offsets resulting from delays introduced as part of network planning as well as other timing delays that may arise due to filters, cables and such other components, for example.

Relating to another embodiment, the above discussion may assume that the range measurements are being calculated at the mobile receiver. However, it is possible that the calculations are performed in the network where the timing information is available offline. In this case, the receiver can measure pseudo ranges $S'_a$, $S'_b$ and $S'_c$, where for instance, $S'_a = \tau_a \times c$, without taking the transmitter timing offset into account. The receiver would relay the pseudo range $S'_a$ to the network and the further corrections by the timing offsets can be easily carried out at the network since the entire almanac can be made available at the network.

The above discussion assumed that the receiver clock is closely synchronized to the common clock and a mismatch between the common clock and the transmitter clock exists due to timing offset or phase adjustment at the transmitter. However, note that this can be considered a special case and the receiver clock need not be synchronized to the common clock. When the receiver clock is not synchronized to the common clock, the delay measurements from the respective transmitters can also include a common bias term, which is the amount of mismatch between the common clock and the receiver clock. The common bias is now another unknown that needs to be computed in addition to the spatial co-ordinates of the receiver. The unknowns in the spatial co-ordinates as well as the clock bias can all be solved for with the help of measurements from additional transmitters. In particular, it suffices to have measurements from e.g., four different transmitters (with the timing offset information available with respect to the common clock source and assuming that the receiver is on the surface of the earth), to solve for both the spatial co-ordinates as well as the common clock bias at the receiver. In the absence of the common clock bias at the receiver (i.e., receiver clock is synchronized to the common clock), it suffices to have delay measurements from e.g., three different transmitters.

Figure 5:
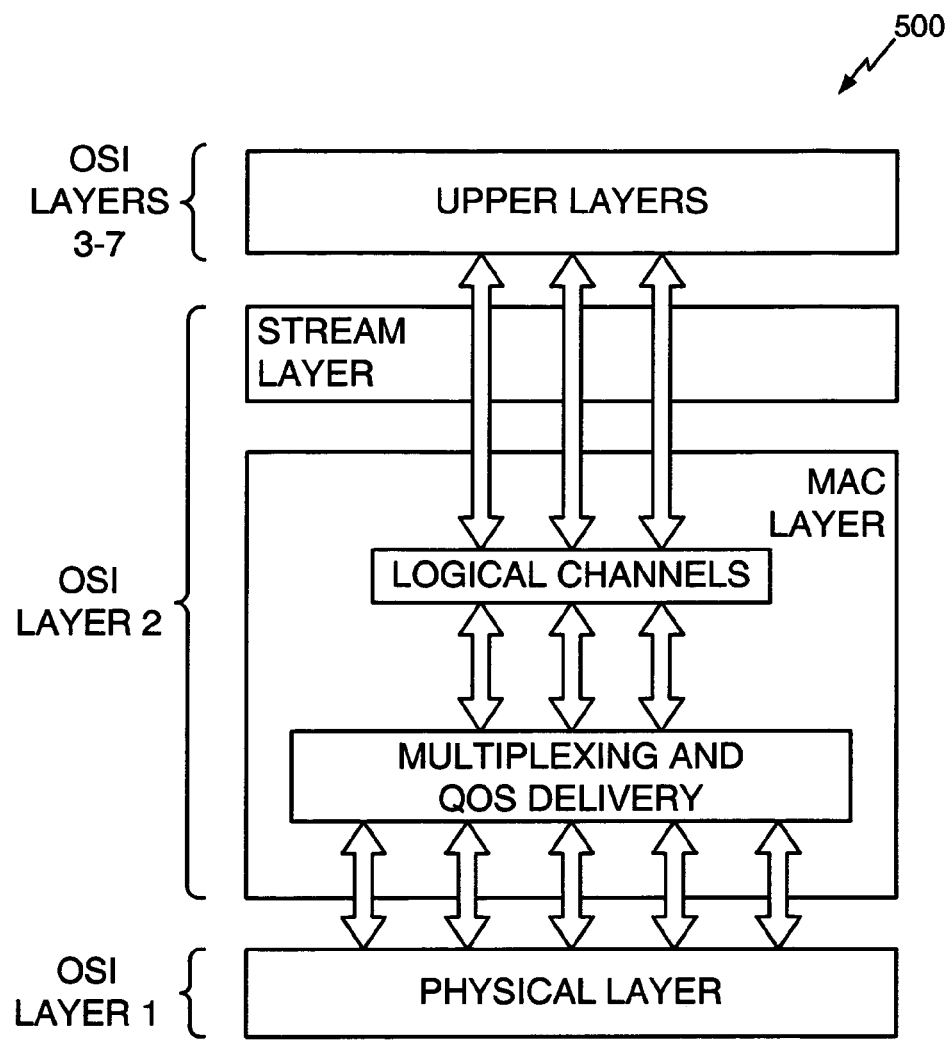
FIG. 5 is a diagram illustrating example network layers for a wireless positioning system.

FIG. 5 illustrates example network layers 500 for a wireless positioning system.

A Forward Link Only (FLO) air interface protocol reference model is shown in FIG. 5. Generally, the FLO air interface specification covers protocols and services corresponding to OSI6 having Layers 1 (physical layer) and Layer 2 (Data Link layer). The Data Link layer is further subdivided into two sub-layers, namely, Medium Access (MAC) sub-layer, and Stream sub-layer. Upper Layers can include compression of multimedia content, access control to multimedia, along with content and formatting of control information.

The FLO air interface specification typically does not specify the upper layers to allow for design flexibility in support of various applications and services. These layers are shown to provide context. The Stream Layer includes multiplexes up to three upper layer flows into one logical channel, binding of upper layer packets to streams for each logical channel, and provides packetization and residual error handling functions. Features of the Medium Access Control (MAC) Layer includes controls access to the physical layer, performs the mapping between logical channels and physical channels, multiplexes logical channels for transmission over the physical channel, de-multiplexes logical channels at the mobile device, and/or enforces Quality of Service (QOS) requirements. Features of Physical Layer include providing channel structure for the forward link, and defining frequency, modulation, and encoding requirements.

In general, FLO technology utilizes Orthogonal Frequency Division Multiplexing (OFDM), which is also utilized by Digital Audio Broadcasting (DAB), Terrestrial Digital Video Broadcasting (DVB-T), and Terrestrial Integrated Services Digital Broadcasting (ISDB-T). Generally, OFDM technology can achieve high spectral efficiency while effectively meeting mobility requirements in a large cell SFN. Also, OFDM can handle long delays from multiple transmitters with a suitable length of cyclic prefix; a guard interval added to the front of the symbol (which is a copy of the last portion of the data symbol) to facilitate orthogonality and mitigate inter-carrier interference. As long as the length of this interval is greater than the maximum channel delay, reflections of previous symbols are removed and the orthogonality is preserved.

Figure 6:
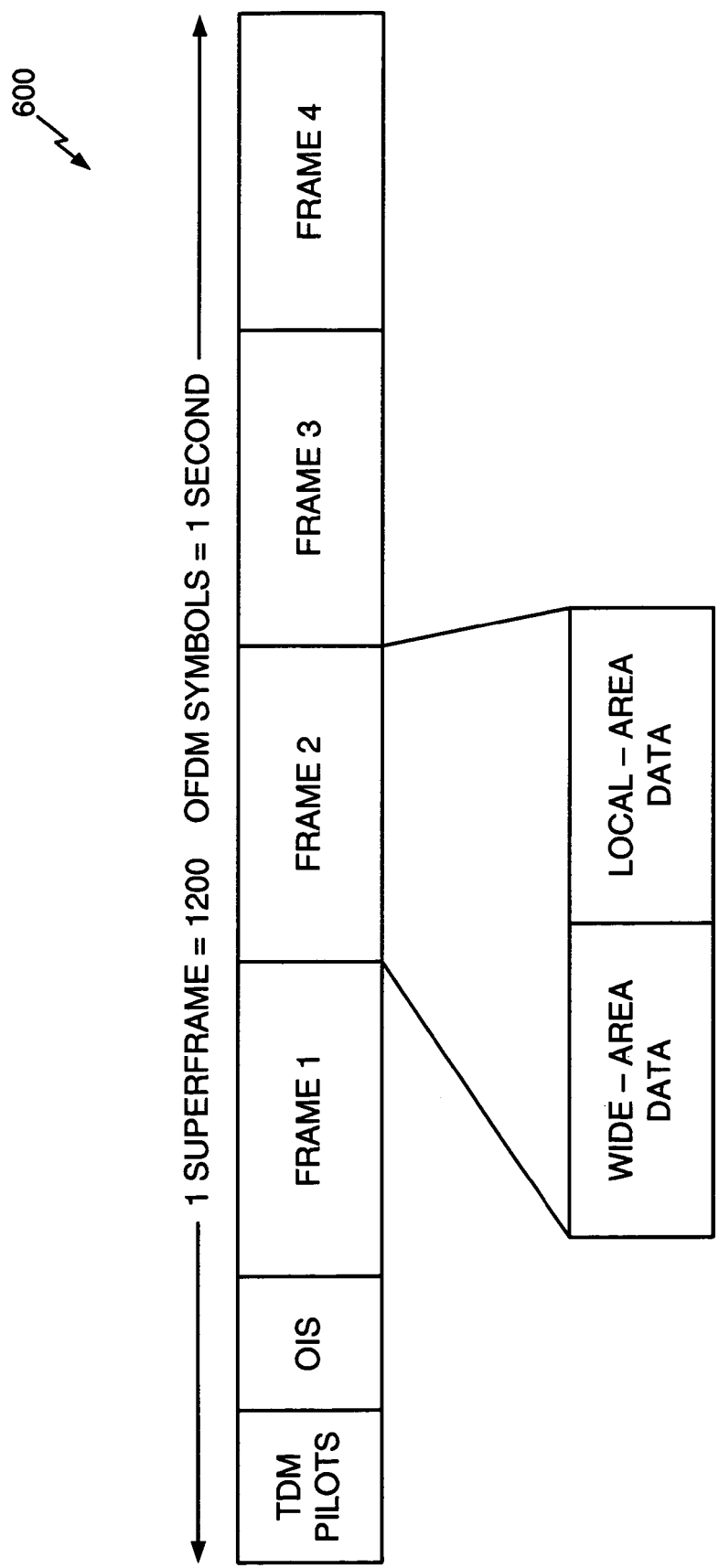
FIG. 6 is a diagram illustrating an example data structure and signal for a wireless positioning system.

Proceeding to FIG. 6, a FLO physical layer 600 is illustrated. The FLO physical layer uses a 4K mode (yielding a transform size of 4096 sub-carriers), providing superior mobile performance compared to an 8K mode, while retaining a sufficiently long guard interval that is useful in fairly large SFN cells. Rapid channel acquisition can be achieved through an optimized pilot and interleaver structure design. The interleaving schemes incorporated in the FLO air interface facilitate time diversity. The pilot structure and interleaver designs optimize channel utilization without annoying the user with long acquisition times. Generally, FLO transmitted signals are organized into super frames as illustrated at 600. Each super frame is comprised of four frames of data, including TDM pilots (Time Division Multiplexed), Overhead Information Symbols (OIS) and frames containing wide-area and local-area data. The TDM pilots are provided to allow for rapid acquisition of the OIS. The OIS describes the location of the data for each media service in the super frame.

Typically, each super frame consists of 200 OFDM symbols per MHz of allocated bandwidth (1200 symbols for 6 MHz), and each symbol contains 7 interlaces of active sub-carriers. Each interlace is uniformly distributed in frequency, so that it achieves the full frequency diversity within the available bandwidth. These interlaces are assigned to logical channels that vary in terms of duration and number of actual interlaces used. This provides flexibility in the time diversity achieved by any given data source. Lower data rate channels can be assigned fewer interlaces to improve time diversity, while higher data rate channels utilize more interlaces to minimize the radio's on-time and reduce power consumption.

The acquisition time for both low and high data rate channels is generally the same. Thus, frequency and time diversity can be maintained without compromising acquisition time. Most often, FLO logical channels are used to carry real-time (live streaming) content at variable rates to obtain statistical multiplexing gains possible with variable rate codecs (Compressor and Decompressor in one). Each logical channel can have different coding rates and modulation to support various reliability and quality of service requirements for different applications. The FLO multiplexing scheme enables device receivers to demodulate the content of the single logical channel it is interested in to minimize power consumption. Mobile devices can demodulate multiple logical channels concurrently to enable video and associated audio to be sent on different channels.

Error correction and coding techniques can also be employed. Generally, FLO incorporates a turbo inner code and a Reed Solomon (RS) outer code. Typically, the turbo code packet contains a Cyclic Redundancy Check (CRC). The RS code need not be calculated for data that is correctly received, which, under favorable signal conditions, results in additional power savings. Another aspect is that the FLO air interface is designed to support frequency bandwidths of 5, 6, 7, and 8 MHz. A highly desirable service offering can be achieved with a single Radio Frequency channel.

Figure 7:
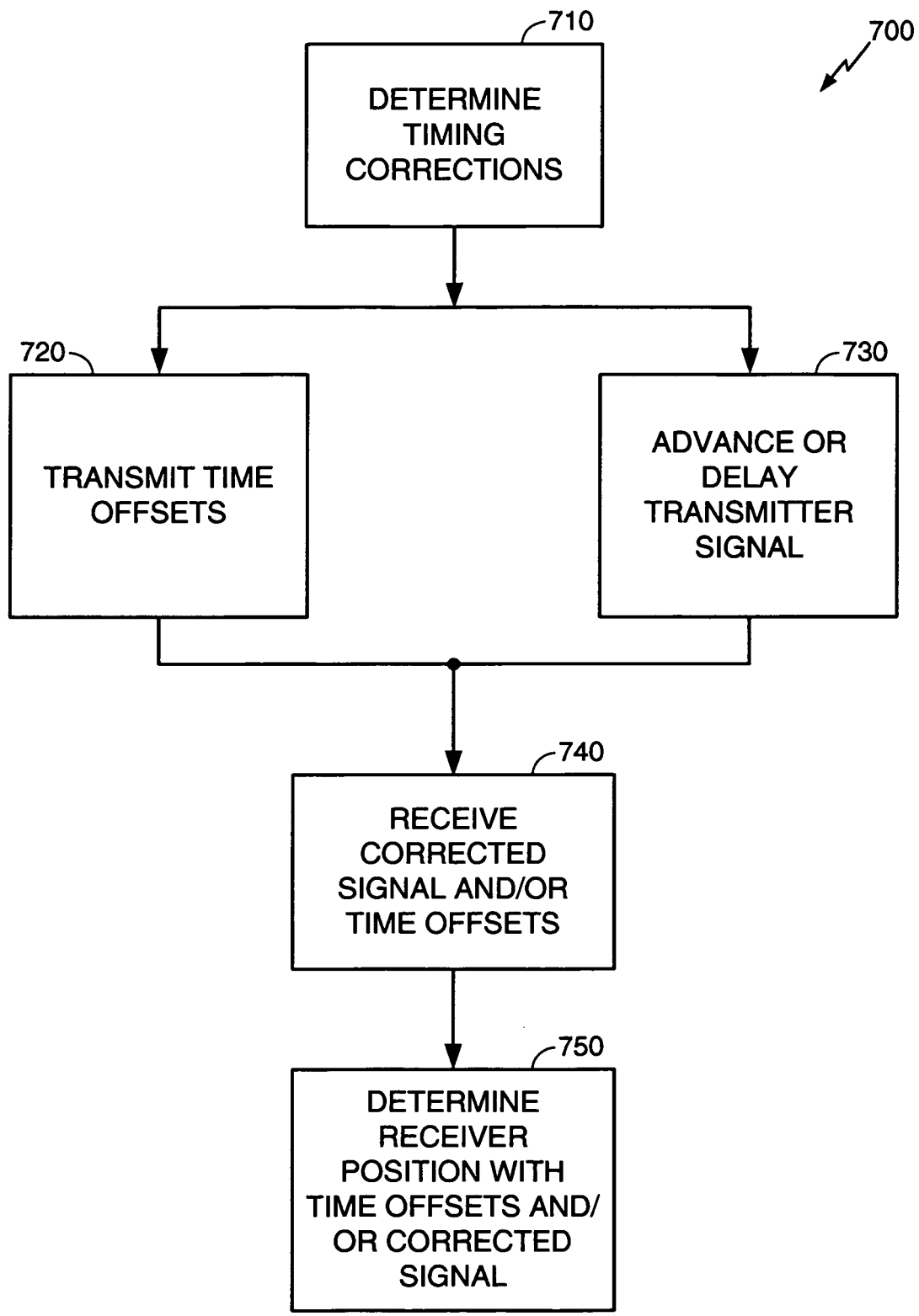
FIG. 7 illustrates an example timing process for a wireless positioning system.

FIG. 7 illustrates a position and location process 700 for wireless systems. While, for purposes of simplicity of explanation, the methodology is shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

Proceeding to 710, various timing corrections are determined. This can include performing calculations to determine timing differences between transmitters, receivers, and/or a centralized clock source. Such differences can be employed to determine timing offsets that may be employed at receivers to correct for differences with a clock or such calculations can be used to determine how much to advance or delay transmitter broadcasts in order to account for timing differences. Test devices can be employed to monitor for potential system changes, where feedback is received from such devices to facilitate determining offsets or transmitter signal adjustments. At 720 one or more time offsets are transmitted as part of a data packet to indicate how potential receiver should adjust position or location calculations. Alternatively, signals can be advance or delayed at 730 to account for timing differences in the wireless network and in reference to a centralized clock. As can be appreciated, both approaches at 720 and 730 can be applied concurrently. For instance, it may be advantageous to transmit constant time offsets at 720 and utilize an adjustable signal advance or delay at 730 if environmental or electrical conditions change. These changes can be monitored and closed loop mechanisms can be employed to automatically adjust system transmissions or timing. In another aspect, an advance or delay in transmit timing may be applied as a constant and time offsets computed and transmitted dynamically at 720 to account for potential detected changes.

At 740, corrected or adjusted signals and/or time offsets are received. As noted above, time offsets may be received, adjusted signals with respect to a clock may be received, or combinations of time offsets and adjusted signals may be received. At 750, time offsets and/or phase adjusted signals are utilized to determine a position at a receiver or receivers. Such information can be employed to automatically compute position location information that accounts for differences that may occur between clocks and reference sources. For instance, time offsets or phase adjusted signals can be received indoors to determine position of a receiver.

Figure 8:
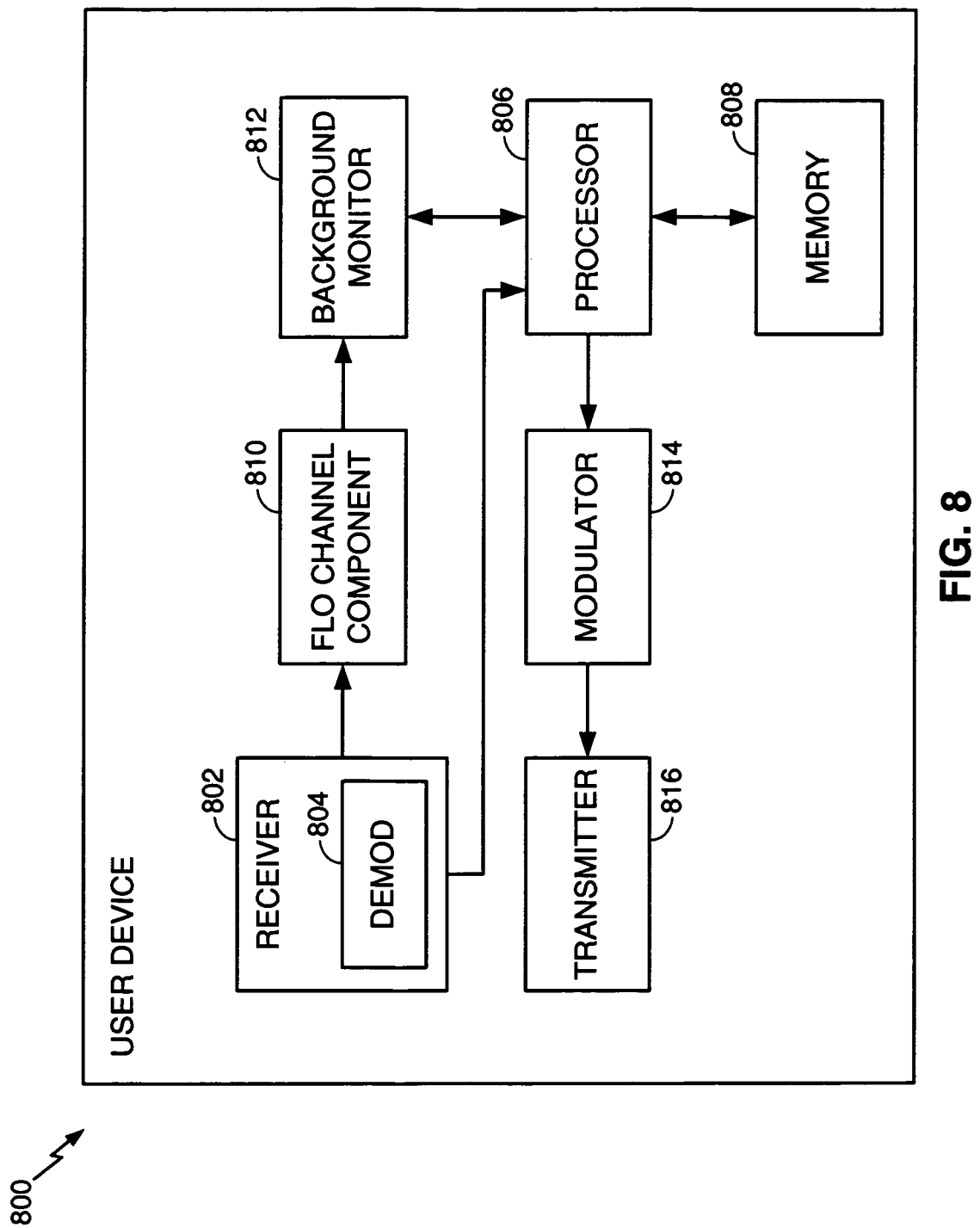
FIG. 8 is a diagram illustrating an example user device for a wireless system.

FIG. 8 is an illustration of a user device 800 that is employed in a wireless communication environment, in accordance with one or more aspects set forth herein. User device 800 comprises a receiver 802 that receives a signal from, for instance, a receive antenna (not shown), and performs typical actions thereon (e.g., filters, amplifies, down converts, etc.) the received signal and digitizes the conditioned signal to obtain samples. Receiver 802 can be a nonlinear receiver, such as a maximum likelihood (ML)-MMSE receiver or the like. A demodulator 804 can demodulate and provide received pilot symbols to a processor 806 for channel estimation. A FLO channel component 810 is provided to process FLO signals as previously described. This can include digital stream processing and/or positioning location calculations among other processes. Processor 806 can be a processor dedicated to analyzing information received by receiver 802 and/or generating information for transmission by a transmitter 816, a processor that controls one or more components of user device 800, and/or a processor that both analyzes information received by receiver 802, generates information for transmission by transmitter 816, and controls one or more components of user device 800.

User device 800 can additionally comprise memory 808 that is operatively coupled to processor 806 and that stores information related to calculated ranks for user device 800, a rank calculation protocol, lookup table(s) comprising information related thereto, and any other suitable information for supporting list-sphere decoding to calculate rank in a non-linear receiver in a wireless communication system as described herein. Memory 808 can additionally store protocols associated rank calculation, matrix generation, etc., such that user device 800 can employ stored protocols and/or algorithms to achieve rank determination in a non-linear receiver as described herein.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory. User device 800 further comprises a background monitor 814 for processing FLO data, a symbol modulator 814 and a transmitter 816 that transmits the modulated signal.

Figure 9:
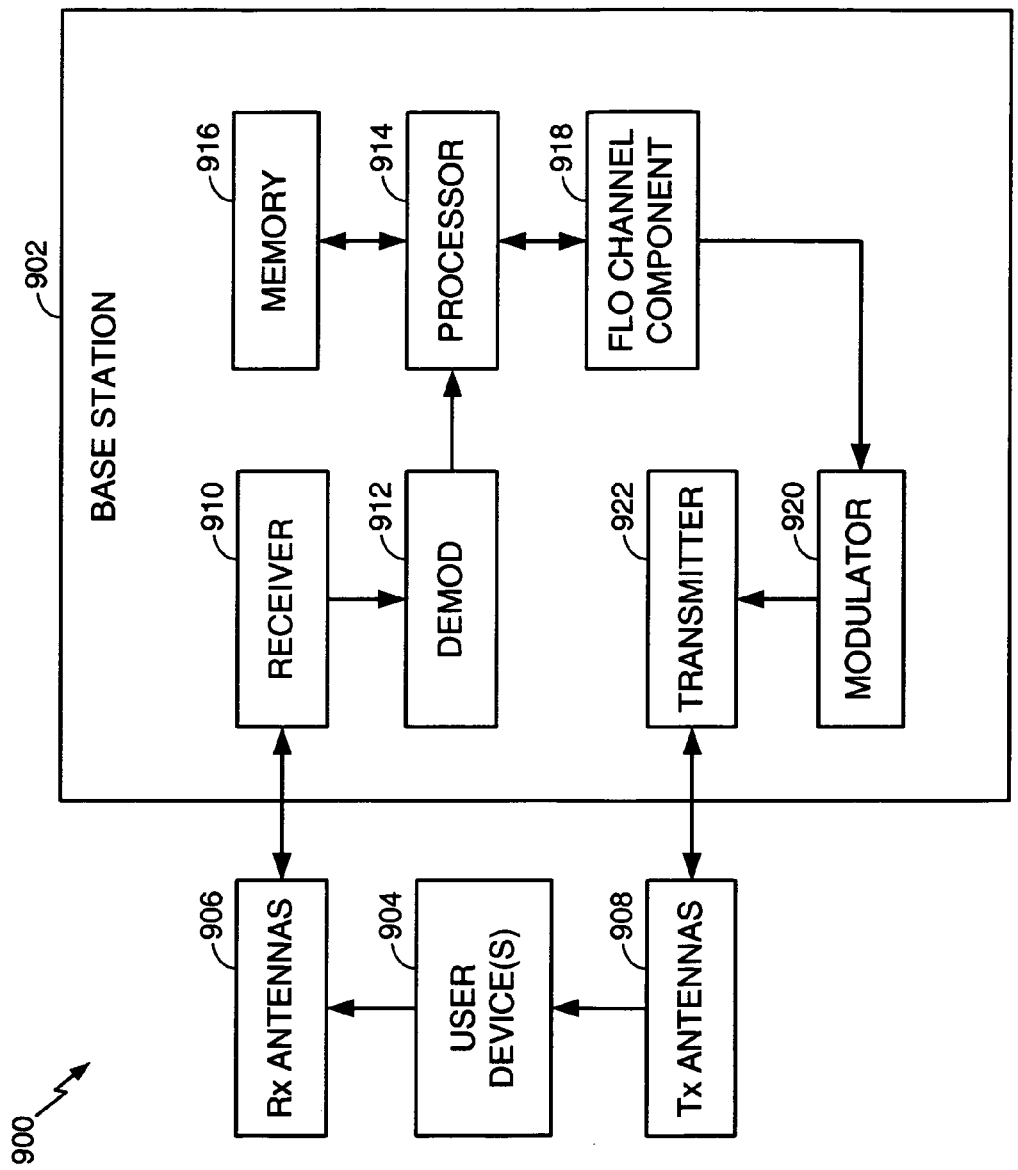
FIG. 9 is a diagram illustrating an example base station for a wireless system.

FIG. 9 is an illustrates an example system 900 that comprises a base station 902 with a receiver 910 that receives signal(s) from one or more user devices 904 through a plurality of receive antennas 906, and a transmitter 924 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 that is similar to the processor described above with regard to FIG. 8, and which is coupled to a memory 916 that stores information related to user ranks, lookup tables related thereto, and/or any other suitable information related to performing the various actions and functions set forth herein. Processor 914 is further coupled to a FLO channel 918 component that facilitates processing FLO information associated with one or more respective user devices 904.

A modulator 922 can multiplex a signal for transmission by a transmitter 924 through transmit antenna 908 to user devices 904. FLO channel component 918 can append information to a signal related to an updated data stream for a given transmission stream for communication with a user device 904, which can be transmitted to user device 904 to provide an indication that a new optimum channel has been identified and acknowledged. In this manner, base station 902 can interact with a user device 904 that provides FLO information and employs a decoding protocol in conjunction with a non-linear receiver, such as an ML-MIMO receiver, and so forth.

Figure 10:
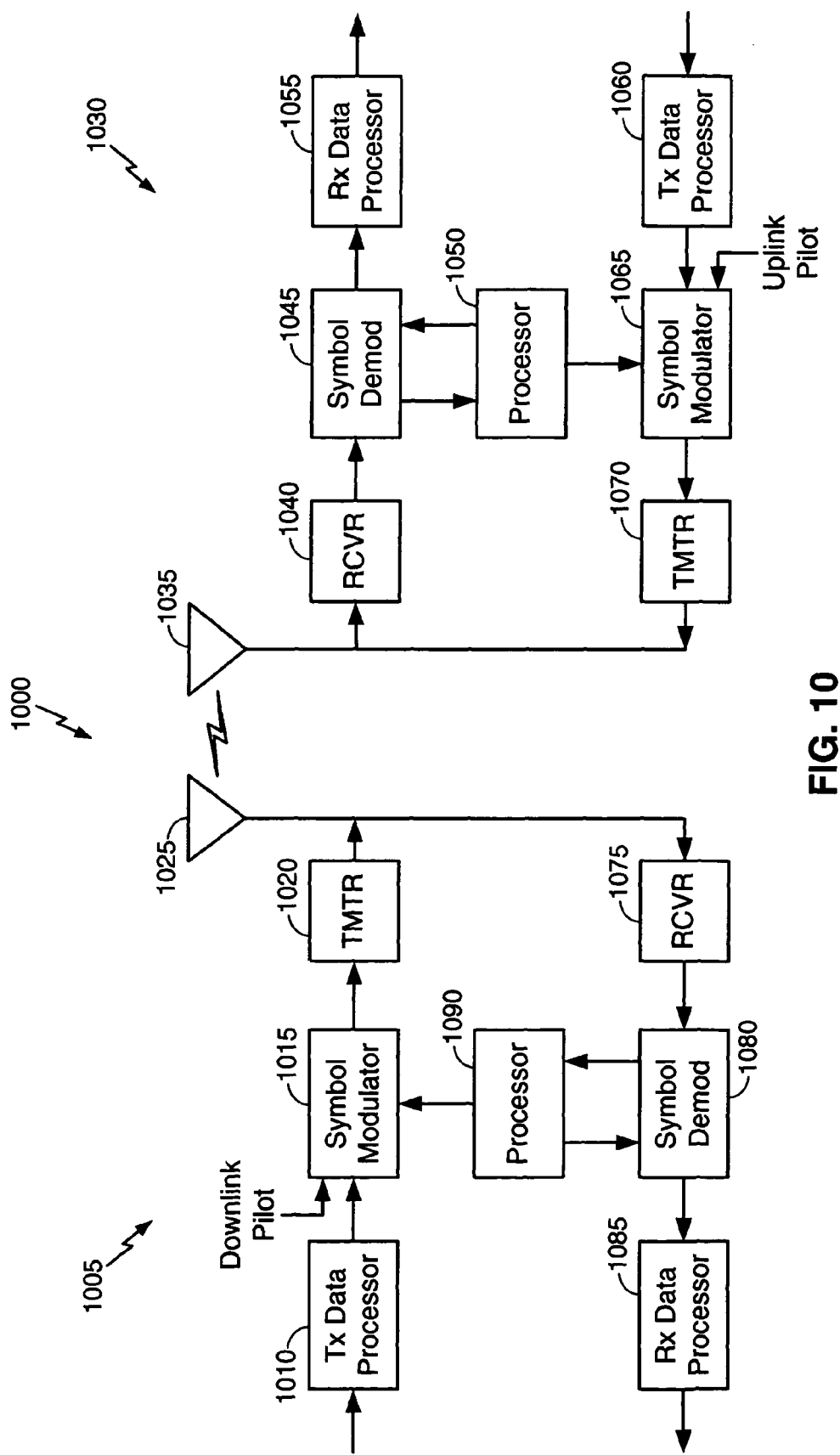
FIG. 10 is a diagram illustrating an example transceiver for a wireless system.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency up converts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency down converts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol de-maps), de-interleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1030. A processor 1090 performs channel estimation for each active terminal transmitting on the uplink. Multiple terminals may transmit pilot concurrently on the uplink on their respective assigned sets of pilot subbands, where the pilot subband sets may be interlaced.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method of adjusting position information in a wireless network, comprising:
    each transmitter of at least three transmitters determining a time difference between a future transmission time of the transmitter and a common clock in the wireless network;
    regulating an effective channel delay spread, as perceived by at least one receiver, by advancing or delaying transmission timing of the future transmission of at least one transmitter of the at least three transmitters relative to the common clock;
    each transmitter of the at least three transmitters cyclically shifting a signal based on the determined time difference, wherein the signal is cyclically shifted according to a cyclic convolution; and
    each of the at least three transmitters transmitting the cyclically shifted signal to the at least one receiver at the transmission time, wherein a position of the at least one receiver is determined based at least on a linear convolution of a channel with the transmitted cyclically shifted signal, from the at least three transmitters, that is processed as the cyclic convolution based on the delay spread of the channel being less than a cyclic prefix employed by the signal.

2. The method of claim 1, further comprising generating at least two timing offsets denoted as $d_a$ and $d_b$.

3. The method of claim 2, further comprising determining a first parameter $\tau'_a$ that is an actual delay is perceived by a line of sight propagation component based on a distance between a first transmitter A and the receiver, and determining a second parameter $\tau'_b$ that is an actual delay that is perceived by a line of sight component from a second transmitter B to the receiver.

4. The method of claim 3, further comprising processing additional delays $d_a$ and $d_b$ at the first and second transmitters based on a delay spread $\tau'_b - \tau'_a$ exceeding a cyclic prefix.

5. The method of claim 4, further comprising processing the following equation:

$$y(n) = h_a(n) * x_a(n-d_a) + h_b(n) * x_b(n-d_b) + w(n),$$

where y(n) represents a signal received at the receiver, $h_a(n)$ and $x_a(n)$ are a channel and a signal with respect to the first transmitter A, * represents a linear convolution operation, w(n) is noise added at the receiver.

6. The method of claim 5, further comprising processing the following equation:

$$y(n) = h_a(n-d_a) * x(n) + h_b(n-d_b) * x(n) + w(n),$$

where a perceived channel delay spread is given by $(\tau'_b - d_b) - (\tau'_a - d_a)$ and controlled by introducing timing offsets at the first transmitter A.

7. The method of claim 5, further comprising determine a cyclic convolution when an effective delay spread is less than a cyclic prefix as in the following equations:

$$y(n) = h_a(n) \otimes x_a(n-d_a) + h_b(n) \otimes x_b(n-d_b) + w(n),$$

or $$y(n) = h_a(n-d_a) \otimes x_a(n) + h_b(n-d_b) \otimes x_b(n) + w(n)$$

where $\otimes$ denotes circular convolution.

8. The method of claim 7, further comprising delaying transmissions from the transmitters thereby meeting length requirements of cyclic prefix.

9. The method of claim 7, further comprising employing a long cyclic prefix to enable an estimation of delay from weak transmitters that are far away.

10. The method of claim 9, further comprising undoing an effect of physical delays by a cyclic shift of a positioning signal, where $x_{a/p}(n)$ is an intended positioning signal from the first transmitter A with timing delay $d_a$, and at least one of the transmitters sends a cyclically shifted version given by $x_{a/p}(n+d_a)$.

11. The method of claim 10, further comprising processing the following equation:

$$y(n)=h_a(n)\otimes x_{a,p}(n)+h_b(n)\otimes x_{b,p}(n)+w(n).$$

12. The method of claim 1, wherein timing information is available offline.

13. The method of claim 12, wherein pseudo ranges are measured.

14. The method of claim 13, further comprising receiving the pseudo ranges.

15. The method of claim 1, wherein a transmission comprises at least one of a frame field, a pilot field, an overhead information field, a wide area field, and a local area field.

16. The method of claim 15, wherein the transmission further comprising an error correction field.

17. The method of claim 1, wherein the cyclically shifting the signals comprises employing a cyclic shift of an Orthogonal Frequency Division Multiplexing (OFDM) symbol carrying the signal to form a shifted OFDM symbol.

18. The method of claim 17, further comprising forming a cyclic prefix of the OFDM symbol based on the shifted OFDM symbol.

19. The method of claim 17, wherein the OFDM symbol comprises an OFDM symbol carrying pilot positioning signals.

20. The method of claim 1, wherein the cyclically shifted signals comprise fixed timing offset information.

21. The method of claim I, wherein the common clock is synchronized to a signal from a Global Positioning System.

22. The method of claim 1, wherein a clock of at least one of the at least three transmitters is synchronized to a frame boundary of the transmitted cyclically shifted signal.

23. The method of claim 1, further comprising employing triangulation techniques to determine the position for the at least one receiver.

24. The method of claim 1, further comprising determining at least one parameter.

25. The method of claim 1, further comprising decoding a data stream.

26. The method of claim 1, further comprising computing a linear convolution of a channel estimate with the transmitted cyclically shifted signal.

27. A machine readable non-transitory non-volatile storage medium having machine executable instructions stored thereon, which when executed by one or more processor results in performing the steps of:
each transmitter of at least three transmitters determining a time difference between a future transmission time of the transmitter and a common clock in a wireless network;
regulating an effective channel delay spread, as perceived by at least one receiver, by advancing or delaying transmission timing of the future transmission of at least one transmitter of the at least three transmitters relative to the common clock;
each of the at least three transmitters cyclically shifting a signal based on the determined time difference, wherein the signal is cyclically shifted according to a cyclic convolution; and
each of the at least three transmitters transmitting the cyclically shifted signal to the at least one receiver at the transmission time, wherein a position of the at least one receiver is determined based at least on a linear convolution of a channel with the transmitted cyclically shifted signal, from the at least three transmitters, that is processed as the cyclic convolution based on the delay spread of the channel being less than a cyclic prefix employed by the signal.

28. The machine readable storage medium of claim 27, having machine executable instructions stored thereon, which when executed further perform the steps of:
employing triangulation techniques with the at least three transmitters to determine location.

29. The machine readable storage medium of claim 27, having machine executable instructions stored thereon, which when executed further perform the steps of:
determining at least one parameter.

30. The machine readable storage medium of claim 27, having machine executable instructions stored thereon, which when executed further perform the steps of: generating at least two timing offsets denoted as $d_a$ and $d_b$.

31. The machine readable storage medium of claim 30, having machine executable instructions stored thereon, which when executed further perform the steps of determining a first parameter $\tau'_a$ that is an actual delay perceived by a line of sight propagation component based on a distance between a first transmitter A and a receiver, and determining a second parameter $\tau'_b$ that is an actual delay that is perceived by a line of sight component from a second transmitter B to the receiver.

32. The machine readable storage medium of claim 31, having machine executable instructions stored thereon, which when executed further performs the steps of processing additional delays $d_a$ and $d_b$ at the first and second transmitters when a delay spread $\tau'_b-\tau'_a$ exceeds a cyclic prefix.

33. The machine readable storage medium of claim 32, having machine executable instructions stored thereon, which when executed further perform the steps of processing the following equation:

$$y(n)=h_a(n)*x_a(n-d_a)+h_b(n)*x_b(n-d_b)+w(n),$$

where y(n) represents a signal received at the receiver, $h_a(n)$ and $X_a(n)$ are a channel and a signal with respect to the first transmitter A, * represents a linear convolution operation, w(n) is noise added at the receiver.

34. The machine readable storage medium of claim 33, having machine executable instructions stored thereon, which when executed further perform the steps of processing the following equation:

$$y(n)=h_a(n-d_a)*x(n)+h_b(n-d_b)*x(n)+w(n),$$

where a perceived channel delay spread is given by $(\tau'_b-d_b)-(\tau'_a-d_a)$ and controlled by introducing timing offsets at the first transmitter A.

35. The machine readable storage medium of claim 33, having machine executable instructions stored thereon, which when executed further perform the steps of determining the cyclic convolution when an effective delay spread is less than a cyclic prefix as in the following equations:

$$y(n)=h_a(n)\otimes x_a(n-d_a)+h_b(n)\otimes x_b(n-d_b)+w(n),$$

or $$y(n)=h_a(n-d_a)\otimes x_a(n)+h_b(n-d_b)\otimes x_b(n)+w(n)$$

where $\otimes$ denotes circular convolution.

36. The machine readable storage medium of claim 35, having machine executable instructions stored thereon, which when executed further perform the steps of delaying transmissions from one or more of the transmitters to meet length requirement of cyclic prefix.

37. The machine readable storage medium of claim 35, having machine executable instructions stored thereon, which when executed further perform the steps of employing a long cyclic prefix to enable an estimation of delay from weak transmitters that are far away.

38. The machine readable storage medium of claim 37, having machine executable instructions stored thereon, which when executed further perform the steps of undoing an effect of physical delays by a cyclic shift of a positioning signal, where $x_{a/p}(n)$ is an intended positioning signal from the first transmitter A with timing delay $d_a$, and the transmitter A sends a cyclically shifted version given by $x_{a/p}(n+d_a)$.

39. The machine readable storage medium of claim 38, having machine executable instructions stored thereon, which when executed further performs the steps of processing the following equation $$y(n)=h_a(n)\otimes x_{a,p}(n)+h_b(n)\otimes x_{b,p}(n)+w(n).$$

40. The machine readable storage medium of claim 27, wherein the cyclically shifted signal comprises fixed timing offset information.

41. The machine readable storage medium of claim 27, wherein the common clock is a clock synchronized to a signal from a Global Positioning System.

42. The machine readable storage medium of claim 27, wherein a clock of at least one transmitter of the at least three transmitters is synchronized to a frame boundary of the transmitted cyclically shifted signal.

43. The machine readable storage medium of claim 27, having machine executable instructions stored thereon, which when executed further perform the steps of decoding a data stream.

44. A system in a wireless network, comprising:
processors, at least one processor in each transmitter of at least three transmitters, that determine a time difference between a future transmission time of the transmitter and a common clock in the wireless network,
wherein at least one processor of at least one of the transmitters regulate an effective channel delay spread, as perceived by at least one receiver, by advancing or delaying transmission timing of the future transmission of at least one transmitter of the at least three transmitters relative to the common clock,
wherein the processors of the at least three transmitters further regulate, each transmitter of the at least three transmitters, cyclically shifting a signal based on the determined time difference, wherein the signal is cyclically shifted according to a cyclic convolution; and
means for, each of the at least three transmitters, transmitting the cyclically shifted signal to the at least one receiver at the transmission time, wherein a position of the at least one receiver is determined based at least on a linear convolution of a channel with the transmitted cyclically shifted signal, from the at least three transmitters, that is processed as the cyclic convolution based on the delay spread of the channel being less than a cyclic prefix employed by the signal.

45. The system of claim 44, further comprising means for generating at least two timing offsets denoted as $d_a$ and $d_b$.

46. The system of claim 45, further comprising means for determining a first parameter $\tau'_a$ that is an actual delay perceived by a line of sight propagation component based on a distance between a first transmitter A and the at least one receiver, and determining a second parameter $\tau'_b$ that is an actual delay that is perceived by a line of sight component from a second transmitter B to the at least one receiver.

47. The system of claim 46, further comprising means for processing additional delays $d_a$ and $d_b$ at the first and second transmitters based on a delay spread $\tau'_b - \tau'_a$ exceeding a cyclic prefix.

48. The system of claim 47, further comprising means for processing the following equation:

$$y(n)=h_a(n)*x_a(n-d_a)+h_b(n)*x_b(n-d_b)+w(n),$$

where y(n) represents a signal received at the receiver, $h_a(n)$ and $X_a(n)$ are a channel and a signal with respect to the first transmitter A, * represents a linear convolution operation, w(n) is noise added at the receiver.

49. The system of claim 48, further comprising means for processing the following equation:

$$y(n)=h_a(n-d_a)*x(n)+h_b(n-d_b)*x(n)+w(n),$$

where a perceived channel delay spread is given by $(\tau'_b-d_b)-(\tau'_a-d_a)$ and controlled by introducing timing offsets at the first transmitter A.

50. The system of claim 48, further comprising means for determining a cyclic convolution based on an effective delay spread being less than a cyclic prefix as in the following equations:

$$y(n)=h_a(n)\otimes x_a(n-d_a)+h_b(n)\otimes x_b(n-d_b)+w(n),$$

or $$y(n)=h_a(n-d_a)\otimes x_a(n)+h_b(n-d_b)\otimes x_b(n)+w(n)$$

where $\otimes$ denotes circular convolution.

51. The system of claim 50, further comprising means for delaying transmissions from the transmitters thereby meeting length requirements of cyclic prefix.

52. The system of claim 50, further comprising means for employing a long cyclic prefix to enable an estimation of delay from weak transmitters that are far away.

53. The system of claim 52, further comprising means for undoing an effect of physical delays by a cyclic shift of a positioning signal, where $x_{a/p}(n)$ is an intended positioning signal from the transmitter A with timing delay $d_a$, and the transmitter A sends a cyclically shifted version given by $x_{a/p}(n+d_a)$.

54. The system of claim 53, further comprising means for processing the following equation:

$$y(n)=h_a(n)\otimes x_{a,p}(n)+h_b(n)\otimes x_{b,p}(n)+w(n).$$

55. The system of claim 45, wherein timing information is available offline.

56. The system of claim 55, wherein pseudo ranges are measured.

57. The system of claim 56, further comprising means for receiving the pseudo ranges.

* * * * *